(12) United States Patent
Okuyama et al.

(10) Patent No.: US 7,631,419 B2
(45) Date of Patent: Dec. 15, 2009

(54) DISK PROCESSING DEVICE AND METHOD

(75) Inventors: Hiromitsu Okuyama, Tokyo (JP); Yuji Horie, Tokyo (JP)

(73) Assignee: NIHON Micro Coating Co., Ltd., Tokyo (JP)

( * ) Notice: Subject to any disclaimer, the term of this patent is extended or adjusted under 35 U.S.C. 154(b) by 208 days.

(21) Appl. No.: 11/893,747

(22) Filed: Aug. 17, 2007

(65) Prior Publication Data

US 2008/0049347 A1 Feb. 28, 2008

(30) Foreign Application Priority Data

Aug. 22, 2006 (JP) .............................. 2006-225828

(51) Int. Cl.
*B23P 19/00* (2006.01)
*G11C 5/12* (2006.01)
*H01M 2/04* (2006.01)

(52) U.S. Cl. ............... 29/737; 29/458; 29/603.03; 29/603.04; 206/710; 206/712; 206/454; 414/408; 414/811; 428/34.1; 428/35.7; 428/922; 428/367; 428/848; 360/135

(58) Field of Classification Search .............. 29/458, 29/603.04, 604, 737; 206/710–712, 454; 414/408, 811; 428/34.1, 35.7, 303, 367, 428/848.1, 834, 922; 360/135
See application file for complete search history.

(56) References Cited

U.S. PATENT DOCUMENTS 5,442,638 A * 8/1995 Awad et al. .................... 714/6
6,081,411 A * 6/2000 Green et al. ................ 360/135

* cited by examiner

*Primary Examiner*—Paul D Kim
(74) *Attorney, Agent, or Firm*—Weaver Austin Villeneuve & Sampson LLP (57) ABSTRACT

A disk processing device holds and rotates a disk with a spindle. Processing tapes are supplied out and wound up by a tape reel unit so as to sandwich and be pressed on both surfaces of the disk through contact rollers. As a crankshaft is rotated, a sliding plate rotates around it and a slidable shaft rotates around a fulcrum part while sliding along the sliding plate such that the contact roller undergoes a reciprocating motion in a radial direction of the disk together with a slider rotatably attached to the slidable shaft.

16 Claims, 4 Drawing Sheets

DISK PROCESSING DEVICE AND METHOD

This application claims priority on Japanese Patent Application 2006-225828 filed Aug. 22, 2006.

BACKGROUND OF THE INVENTION

This invention relates to a device for and a method of processing the surface of a magnetic hard disk, its substrate and a semiconductor wafer.

Data processing devices for recording and reproducing data such as characters, images and sounds are coming to be incorporated not only into a personal computer but also into an electronic apparatus such as a television, a camera, a portable music player and a portable telephone. Such data processing devices are required to have a higher processing capability (or an increased recording capacity) and an improved accuracy in reproduction, as well as compactness.

Data processing devices record and reproduce such data magnetically by means of a magnetic head on and from a magnetic recording medium. The magnetic recording medium comprises an aluminum substrate having a Ni—P plating on its surface or a glass substrate (hereinafter generally referred to as the disk) with a substrate layer, a magnetic layer and a protective layer sequentially formed on its surface after it is subjected to polishing and texturing processes.

Methods of magnetically recording data on such a magnetic recording medium generally include the so-called longitudinal recording method for recording in the direction of the circumference and the perpendicular recording method for recording in the perpendicular directions.

According to the longitudinal recording method, the surface of the magnetic hard disk is made appropriately rough so as to prevent the magnetic head from becoming adsorbed thereonto and a magnetic layer is formed after a texturing process is carried out to form concentric circular marks on the disk surface for providing anisotropic magnetic characteristic to the magnetic layer in the direction of the circumference of the disk (substrate).

The texturing process is carried out for forming concentric circular marks on the surface of the disk by rotating the disk, supplying slurry to the disk surface, and oscillating a processing tape in the radial direction of the disk while pressing this processing tape through a contact roller. The rotational speed of the disk is within the range of 300 rpm or more and 600 rpm or less, the frequency of the oscillation is within the range of 5 Hz or more and 10 Hz or less, and the amplitude of the oscillation is about 1 mm.

The perpendicular recording method is for attaining an even higher recording density by orienting the magnetization axis of the magnetic layer (or the magnetic recording layer), which has been directed in a direction towards the interior of the magnetic recording medium, perpendicular to the surface of the magnetic recording medium. This method is now attracting attention as a new recording method taking the place of the longitudinal recording method.

The perpendicular magnetic recording medium is of a two-layer structure comprising a soft magnetic layer referred to as a soft magnetic backing layer (or a soft magnetic layer substrate layer) which is adapted to easily pass the magnetic fluxes from the magnetic head and is formed below a magnetic recording layer for recording data.

According to the perpendicular magnetic recording method, magnetic fields are not in the direction of the circumference, as done according to the longitudinal recording method described above. Instead, the surface of the disk must be processed such that magnetic fields are easily oriented in the perpendicular direction with respect to the surface of the disk. The soft magnetic backing layer is a layer for passing magnetic field such that the magnetic recording layer is magnetized in the perpendicular direction. Thus, methods of providing a magnetic anisotropy such that the magnetization axis of a soft magnetic layer will be oriented in the direction of the diameter of the disk are being investigated as technologies for improving recording and reproduction and obtaining superior recording and reproduction characteristics with low noise by improving the magnetic permeability in the circumferential direction of the soft magnetic layer, as described, for example, in Japanese Patent Publications Tokkai 6-180834, 10-214719 and 2-126421.

Japanese Patent Publications Tokkai 6-180834 and 10-214719 describe technology of forming a ferromagnetic layer of a Co alloy or the like as the upper or lower layer of the soft magnetic backing layer and magnetizing this layer in a desired direction and technology of forming a paramagnetic layer and pinning magnetization by using exchange bonding.

As a technology for providing magnetic anisotropy such that the magnetization axis of a soft magnetic layer will be oriented in the radial direction of the disk, Japanese Patent Publication Tokkai 2-126421 discloses a method of forming fine straight grooves in the radial direction on the surface of a disk such that the magnetization axis of the soft magnetic backing layer formed on the disk will be directed along these grooves and that the magnetic permeability of the soft magnetic backing layer will have high values in the circumferential direction of the magnetic recording medium.

Such straight grooves cannot be formed in the radial direction of a disk with a sufficiently high processing speed (or with a sufficiently high throughput), however, with conventional disk processing devices which have been used simply as a texturing device for the longitudinal recording method.

As shown, for example, in FIG. 8 of Japanese Patent Publication Tokkai 8-7266 and FIG. 7 of Japanese Patent Publication Tokkai 8-63745, disk processing devices used for the texturing are adapted to rotate a disk, to supply polishing slurry to its surface through a nozzle, to press a processing tape to it through a contact roller and to cause this processing tape to undergo a reciprocating motion (or to oscillate) in the radial direction of the disk such that concentric circular marks are formed on the disk surface, the rotational speed of the disk being within the range of 300 rpm or more and 600 rpm or less, the frequency of the oscillation being within the range of 5 Hz or more and 10 Hz or less, and the amplitude of the oscillation being about 1 mm, as explained above.

With such a conventional disk processing device, the oscillating motion is effected while the disk is rotated at a fixed position and causing the contact roller to undergo a reciprocating motion in the radial direction of the disk by means of a piezoelectric element, a linear motor or an eccentric cam.

If a piezoelectric element is used for the oscillation, a sufficiently large amplitude cannot be attained. The force for effecting the reciprocating motion varies, depending on the amplitude, and there is also the problem of poor durability.

If a linear motor is used for the oscillation, a sufficiently large amplitude can be attained but since it relies on magnetism, it is not suitable for the processing of a magnetic recording medium.

If an eccentric cam is used for the oscillation, the contract roller can be reciprocatingly moved with a sufficiently large amplitude, the amplitude can be controlled with a high level of accuracy and the frequency can be made large. If both the amplitude and the frequency are increased, however, the device begins to vibrate due to frictions, etc. of the mechanism for converting the rotation of the motor into the linear reciprocating motion of the contact roller, and hence the disk cannot be processed with a high level of accuracy. For this reason, it has been difficult to achieve an oscillation with frequency in excess of 20 Hz with a conventional technology. In other words, the rotational speed of the disk had to be lowered with a conventional disk processing device and a sufficiently large throughput could not be obtained.

SUMMARY OF THE INVENTION

It is therefore an object of this invention to provide a disk processing device and method capable of highly accurately processing the surface of a disk not only for the longitudinal recording but also for perpendicular magnetic recording.

A disk processing device according to this invention with which the object of this invention can be accomplished is for processing both surfaces of a disk, and may be characterized as comprising a spindle for holding and rotating the disk and a processing head with a pair of contact rollers for pressing processing tapes to both surfaces of the disk. The processing head includes a first contact roller unit and a second contact roller unit each with oscillating means for causing corresponding one of the contact rollers to move reciprocatingly in a radial direction of the disk held by the spindle, a tape reel unit for supplying and winding up the processing tapes pressed to the surfaces of the disk through the contact rollers, and tape pressing means for causing the first and second contact roller units to slide, sandwiching the surfaces of the disk with the contact rollers and pressing the processing tapes onto the surfaces of the disk. The oscillating means comprises a slider which is reciprocatingly movable in a radial direction of the disk and to which the corresponding contract roller is attached, and a crankshaft mechanism for reciprocatingly moving the slider in the radial direction of the disk. The crankshaft mechanism comprises a crankshaft, crankshaft rotating means for rotating the crankshaft, a sliding plate which is rotatably attached eccentrically to the crankshaft and has a shaft (herein referred to as the rotary shaft) that rotates around the crankshaft if the crankshaft rotates, another shaft (herein referred to as the slidable shaft for the convenience of distinction) which is slidably attached to the sliding plate and has one end that is on the side of the sliding plate and is a free end and the other end that is rotatably attached to the slider, and a fulcrum part provided on the slidable shaft.

If the crankshaft is rotated, the sliding plate rotates around the crankshaft, and the slidable shaft rotates around the fulcrum part thereon while sliding along the sliding plate such that the contact roller undergoes a reciprocating motion in the radial direction of the disk together with the slider.

The crankshaft mechanism may further include amplitude varying means for positioning the fulcrum part. The amplitude varying means may include a second sliding plate slidably attached to the slidable shaft, a fulcrum member above the slidable shaft and attached rotatably to the second sliding plate as the fulcrum part, and a fulcrum moving means for moving the second sliding plate having the fulcrum member attached thereto along the slidable shaft.

As the fulcrum part is moved to and positioned on the side of one of the end parts of the slidable shaft (on the side of the sliding plate at the eccentric position from the crankshaft), the distance of reciprocating motion (or the amplitude of oscillation) of the contact roller in the radial direction of the disk becomes large. If the fulcrum part is moved to and positioned on the side of the other end part of the shaft (on the side of the slider), on the other hand, the distance of reciprocating motion (or the amplitude of oscillation) of the contact roller in the radial direction of the disk becomes smaller. In other words, the distance of reciprocating motion (or the amplitude of oscillation) of the contact roller in the radial direction of the disk can be determined by selectively positioning the fulcrum part on the slidable shaft.

The means for rotating the crankshaft includes a motor and the frequency of the oscillation can be controlled by controlling the rotation of this motor. If the rotation of the motor is made faster, the frequency of the oscillation becomes higher. If the motor is rotated slower, the frequency of the oscillation becomes lower. Thus, the frequency of reciprocating motion of the contact roller in the radial direction of the disk (frequency of the oscillation) can be controlled by controlling the rotation of the motor. A high-speed motor (with rotational speed of 3000 rpm) may be included as an example of this motor. The frequency of the oscillation is within the range of 5 Hz or more and 50 Hz or less, or preferably within the range of 20 Hz or more and 50 Hz or less.

A method of processing a disk by using the disk processing device of this invention as described above includes the steps of causing the disk to be held and rotated by the spindle, using the tape pressing means to sandwich both surfaces of the disk with the processing tapes through the contact rollers and pressing the processing tapes on the surfaces of the disk, supplying and winding up the processing tapes pressed to the surfaces of the disk through the contact rollers by means of the tape reel unit, and rotating the crankshaft, thereby rotating the sliding plate around the crankshaft, rotating the slidable shaft around the fulcrum part provided to the slidable shaft while causing the slidable shaft to slide along the sliding plate, and causing the contact roller to move reciprocatingly in a radial direction of the disk together with the slider rotatably attached to the slidable shaft.

The method of this invention may further comprise the steps of positioning the fulcrum part on the slidable shaft and thereby determining a distance of reciprocating motion of the contact roller in the radial direction of the disk.

The aforementioned step of rotating the crankshaft may include the step of rotating a motor, and the step of rotating the motor may further include the step of controlling the rotation of the motor and thereby controlling the frequency of the reciprocating motion of the contact roller in the radial direction of the disk.

With the crankshaft mechanism of this invention thus structured, the sliding plate rotates around the crankshaft as the crankshaft is rotated, and the slidable shaft rotates around the fulcrum part on this slidable shaft while the slidable shaft slides along the sliding plate such that the contact roller undergoes a reciprocating motion in the radial direction of the disk together with the slider that is attached rotatably to the slidable shaft. As a result, when the motor causes the crankshaft to undergo a high-speed rotary motion, the device does not vibrate, say, due to the friction in the mechanism for converting the rotary motion of this motor into the linear motion of the contact roller, and hence both surfaces of the disk can be processed at a high level of accuracy.

DETAILED DESCRIPTION OF THE INVENTION

Figure 1A:
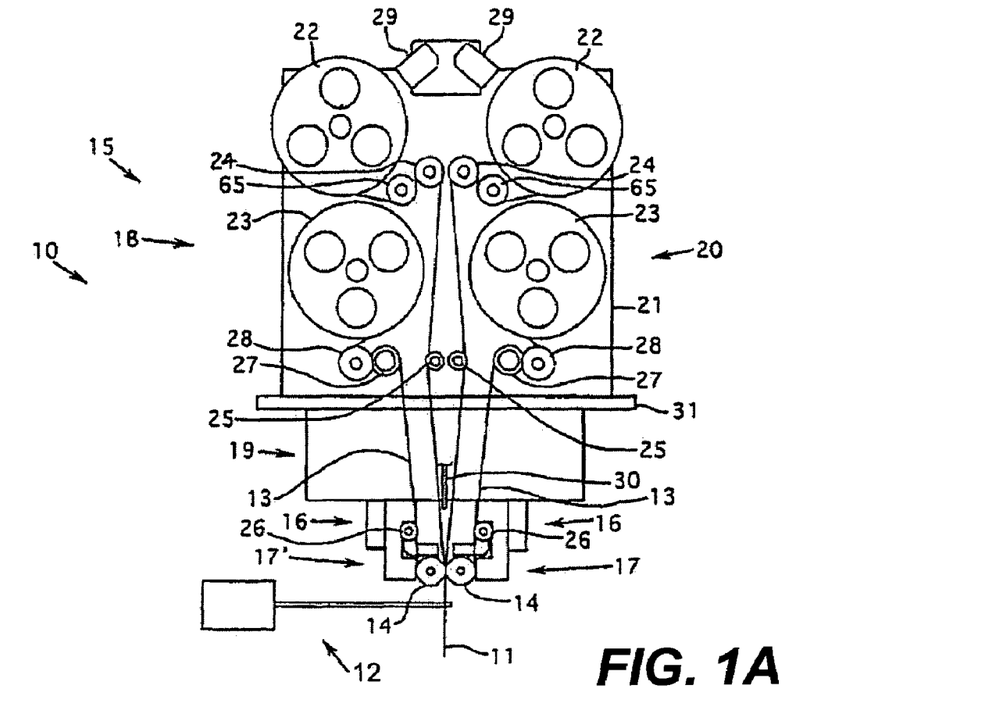
FIGS. 1A and 1B are respectively a front view and a side view of a disk processing device embodying this invention.
Figure 1B:
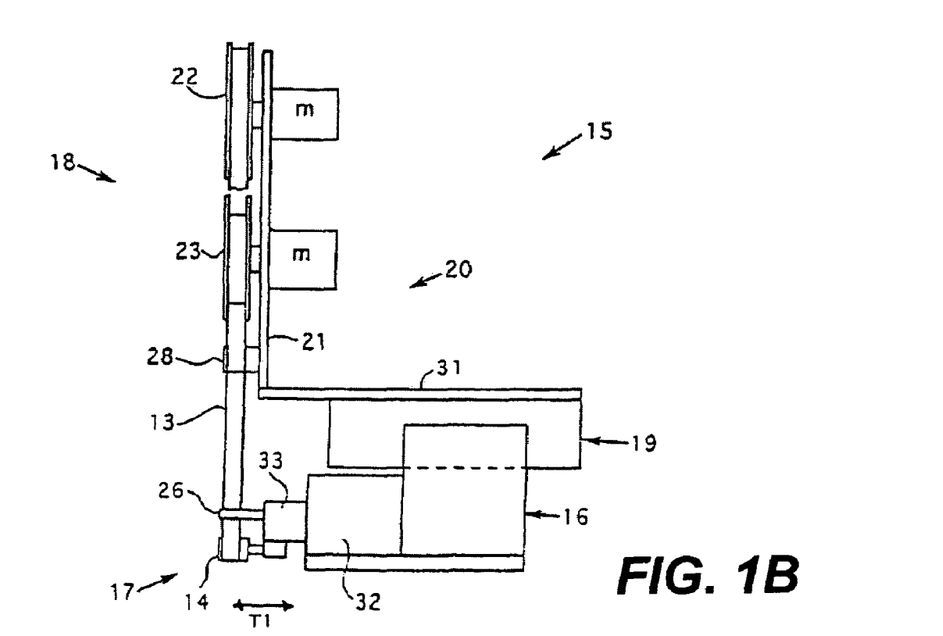

FIGS. 1A and 1B show a disk processing device 10 embodying this invention for processing both surfaces of a disk such as a magnetic hard disk and its substrate, as well as a semiconductor wafer, comprising a processing head 15 provided with a spindle 12 for holding and rotating a disk 11 and a pair of contact rollers 14 for pressing processing tapes 13 onto both surfaces of the disk 11. The contact rollers 14 are made of a foamed or non-foamed material comprising synthetic resin (such as urethane rubber and nitrile rubber). When they are used for the processing of a disk of less than 2.5 inches, their size may be 25φ and 19φ in outer and inner diameters and 22 mm in width (in longitudinal direction). Their hardness may be within the range of 40 duro or more and 90 duro or less.

The processing tapes 13 may be selected from woven tapes, non-woven tapes, raised cloth tapes, flocked tapes and foamed tapes. Woven tapes, non-woven tapes, raised cloth tapes and flocked tapes comprise one or more kinds of fibers selected from the group consisting of polyester fibers, nylon fibers, etc. with thickness within the range of 0.1 μm or more and 5 μm or less. As for the raised cloth tapes and flocked tapes, only their surface portion or their raised or flocked portions need to comprise such fibers.

The processing head 15 comprises a first contact roller unit 17 having oscillating means 16 for causing one of the contact rollers 14 to undergo a reciprocating motion in the radial direction (indicated by arrow T1 in FIG. 1B) of the disk 11 held by the spindle 12, a second contact roller unit 17' having oscillating means 16 for causing the other contact rollers 14 to undergo a reciprocating motion in the radial direction of the disk 11 held by the spindle 12, a tape reel unit 18 for feeding the processing tapes 13 pressed onto the both surfaces of the disk 11 through the contact rollers 14 and winding them up, and a tape pressing means 19 for causing the first and second contact rollers 14 to sandwich both surfaces of the disk 11 with the contact rollers 14 by causing the first and second contact roller units 17 and 17' to slide and causing the processing tapes 13 to be pressed against both surfaces of the disk 11 through the contact rollers 14.

The tape reel unit 18 has tape feeding reels 22 and take-up reels 23 that are symmetrically placed to the left and to the right of a front part 21 of a supporting plate 20 which is L-shaped as seen from the side. These reels 22 and 23 are adapted to be rotated by motors m each disposed on the back side of the front part 21 such that the processing tapes 13 are supplied from the feeding reels 22 and wound up around the take-up reels 23 through a set of guide rollers 65, tension detecting rollers 24, another set of guide rollers 25, the contact rollers 14, still another set of guide rollers 26, nip rollers 27 and eccentric rollers 28.

The tension detecting rollers 24 serve to detect the tension in the processing tapes 13 and to feed it back to the take-up reels 23 such that the tensions in the processing tapes 13 are maintained to be constant. The eccentric rollers 28 coupled with the nip rollers 27 are for forming gaps for passing the processing tapes 13 through by rotating when the processing tapes 13 are set to the disk processing device 10.

The tape reel unit 18 is also provided with tape end sensors 29 for detecting the remaining amounts of the processing tapes 13 on the feeding reels 22. If the remaining amounts detected by the tape end sensors 29 reach a specified threshold value, the supply of the processing tapes 13 is stopped.

While the disk 11 is being processed, processing slurry is supplied through a nozzle 30 positioned above the disk 11 into the space between both surfaces of the disk 11 and the processing tapes 13. The processing slurry is obtained by dispersing abrading particles in water or a water-based aqueous solution. The abrading particles may include cluster particles or agglomerated particles of monocrystalline and polycrystalline diamond with average particle diameter of 1 nm or more and 20 nm or less.

The first and second contact roller units 17 and 17' are disposed so as to face each other and connected through tape pressing means 19 to the base part 31 of the supporting plate 20. Since the first and second contact roller units 17 and 17' are structured similarly, the first contact roller unit 17 alone will be described below and the second contact roller unit 17' will not be described repetitiously.

Figure 2:
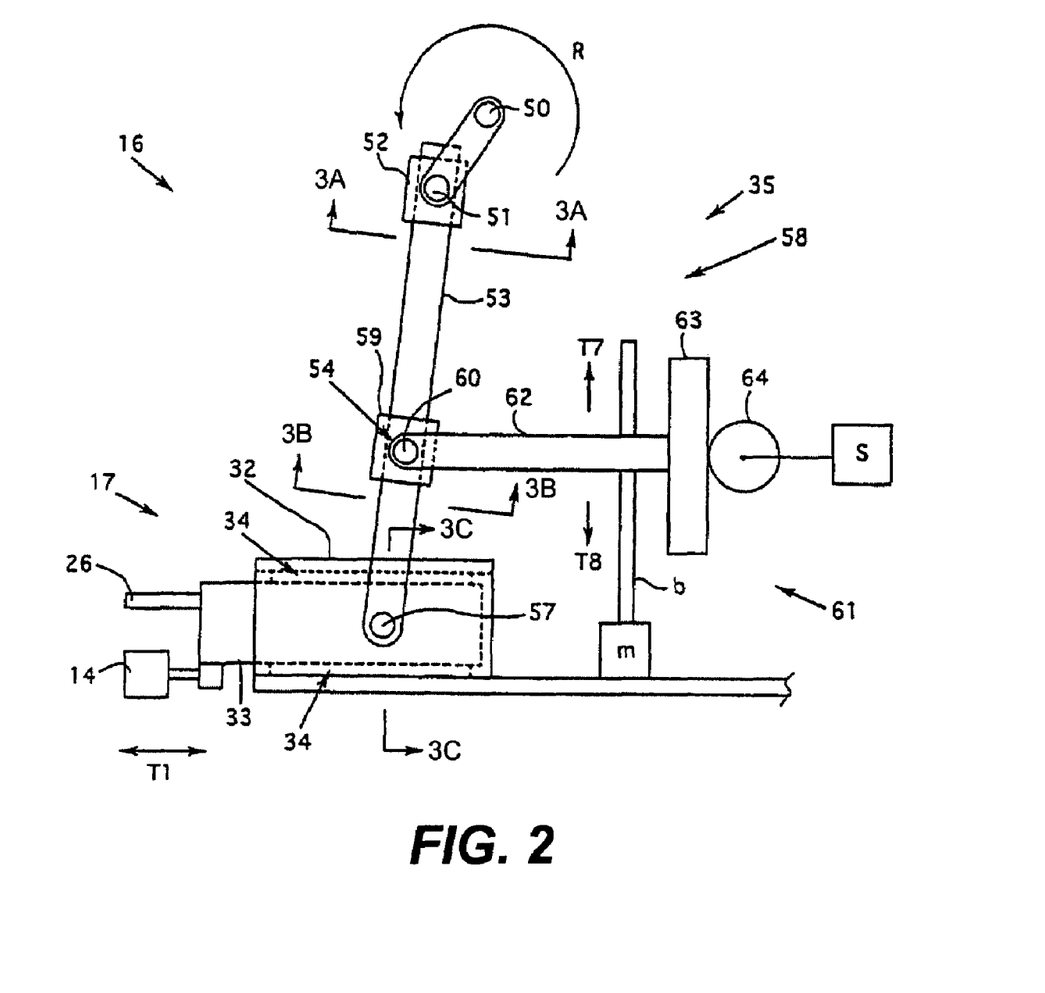
FIG. 2 is a side view of the oscillating means.
Figure 4A:
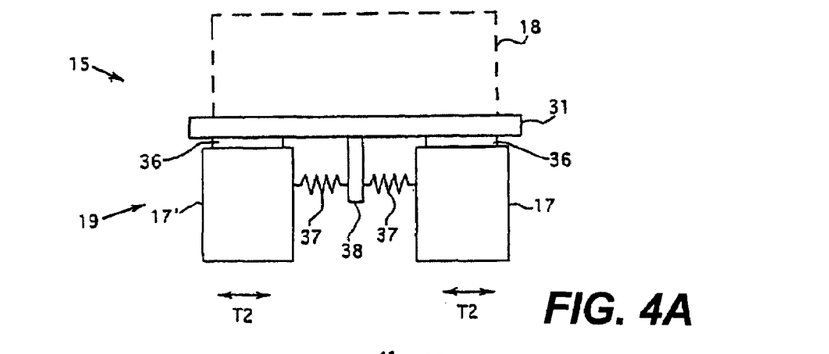
FIGS. 4A and 4B are each a front view of the tape pressing means.
Figure 4B:
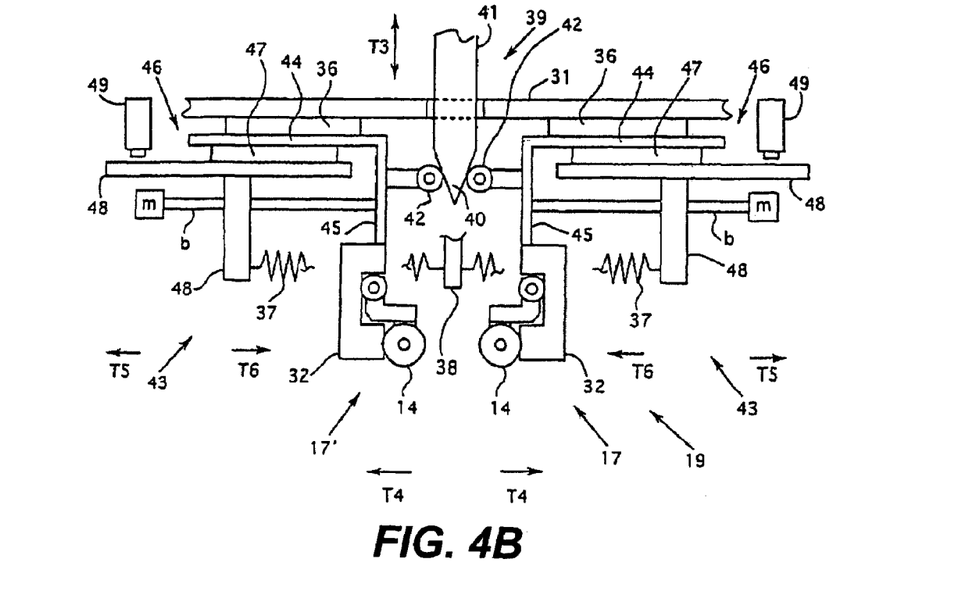

The first contact roller 17 comprises a frame 32, a slider 33 attached slidably to the frame 32, and a contact roller 14 affixed to the slider 33, as shown in FIGS. 1B, 2 and 4B. As shown in FIG. 2, the frame 32 is connected to the base part 31 of the supporting plate 20 through a linear guide 34 so as to be slidable in the direction of arrow T1, capable of moving reciprocatingly by means of the tape pressing means 19 in the direction of arrow T2.

The slider 33 is attached to the frame 32 through the linear guide 34 so as to be slidable in the direction of arrow T1 (or the radial direction of the disk 11 held by the spindle 12), and the slider 33 fastening the contact roller 14 through a crankshaft mechanism 35 (to be described below) undergoes a reciprocating motion (or oscillates) in the direction of arrow T1.

The tape pressing means 19 serves to connect the lower surface of the base part 31 of the supporting plate 20 and each of the contact roller units 17 and 17' through a linear guide 36, as shown in FIGS. 4A and 4B, such that the contact roller units 17 and 17' are pulled by the elastic forces of springs 37 attached to a fixed plate 38 affixed to the base part 31 of the supporting plate 20. Thus, the disk 11 held by the spindle 12 is sandwiched between the contact rollers 14 and the processing tapes 13 are pressed onto the surfaces of the disk 11.

The compressive pressure applied to both surfaces of the disk 11 can be released by means of a primary pressure applying system 39 shown in FIG. 4B. The primary pressure applying system 39 is capable of releasing and adjusting the compressive pressure by means of a rod 41 having a conically shaped interposed part 40 at its lower end and adapted to move vertically upward and downward in the direction of arrow T3 through a ball screw (not shown) by means of a motor affixed to the supporting plate 20. Explained more in detail, the conically shaped interposed part 40 of the rod 41 is engaged with engaging wheels 42 which are provided opposite to each other to the frames 32 of the first and second contact roller units 17 and 17' such that, as the rod 41 is lowered, the first and second contact roller units 17 and 17' move away from each other against the elastic forces of the springs 37 in the directions of arrows T4 (or the contact rollers 14 move away from the surfaces of the disk 11) and the compressive pressure being applied to the surfaces of the disk 11 are released.

The compressive pressure applied to both surfaces of the disk 11 can also be adjusted by a vertical motion of the rod 41 in the direction of arrows T3. If the rod 41 is moved upward, the compressive pressure applied to both surfaces of the disk 11 is increased. If the rod 41 is moved downward, this compressive pressure is reduced.

The disk processing device 10 according to this invention is further provided with secondary pressure applying systems 43 for carrying out fine adjustments on the compressive pressure applied to both surfaces of the disk 11. They are provided individually to the frame 32 of the two contact roller units 17 and 17' and since they are structurally the same, only the secondary pressure applying system 43 provided to the first contact roller unit 17 will be described below.

As shown in FIG. 4B, each secondary pressure applying system 43 comprises a supporting plate 46 of an inverse L-shape having a ceiling plate 44 above the frame 32 and a side plate 45, a mobile plate 48 connected to the ceiling plate 44 through a linear slide guide 47 so as to be movable in the direction of arrow T2 and having an end of the spring 37 attached thereto, and a motor m and a ball screw b for moving the mobile plate 48 reciprocatingly with respect to the side plate 45 of the supporting plate 46 in the direction of arrow T2.

According to the illustrated example, the motors m are operated after the mobile plate 48 is fastened with a lock air cylinder 49 to cause a reciprocating motion of the mobile plate 48 with respect to the side plate 45 of the supporting plate 46 in the direction of arrow T2. If the mobile plate 48 is moved in the direction of arrow T5, the elastic force of the spring 37 becomes weaker, and the compressive pressure of the contact roller 14 on the disk 11 becomes smaller. If the mobile plate 48 is moved in the direction of arrow T6, on the other hand, the elastic force of the spring 37 becomes stronger, and the compressive pressure of the contact roller 14 on the disk 11 becomes larger. Since the motion of the mobile plate 48 is effected by means of the ball screw b, the distance of motion of the mobile plate 48 can be accurately controlled and hence a fine adjustment of the compressive force becomes possible by the secondary pressure applying system 43.

As shown in FIG. 2, the oscillating means 16 comprises the slider 33 which is movable reciprocatingly in the radial direction of the disk 11 and to which the control roller 14 is attached, and the crankshaft mechanism 35 for moving this slider 33 in the radial direction of the disk 11.

The slider 33 is set slidably to the linear guide 34 attached to the contact roller unit 17 (or 17'). The linear guide 34 is arranged, as shown, such that the slider 33 will slide in the radial direction (the direction of arrow T1) of the disk 11 held by the spindle 12. A rolling linear guide may be used as an example of such a linear guide.

As shown in FIG. 2, the crankshaft mechanism 35 comprises a crankshaft 50, means for rotating this crankshaft 50 in the direction of arrow R, a sliding plate 52 rotatably attached eccentrically from the crankshaft 50 (such as 0.5 mm from the crankshaft) and having a rotary shaft 51 that will rotate around the crankshaft 50 if the crankshaft 50 rotates, another shaft 53 which is slidably attached to the sliding plate 52, of which the end on the side of the sliding plate 52 is free and of which the other end is rotatably attached to the slider 33, and a fulcrum part 54 on this shaft 53 (hereinafter referred to as the slidable shaft).

If this crankshaft 50 is rotated, the sliding plate 52 rotates around the crankshaft 50, and the slidable shaft 53 rotates around the fulcrum part 54 thereon while sliding along the sliding plate 52 such that the contact roller 14 undergoes a reciprocating motion (oscillations) together with the slide 33 in the radial direction T1 of the disk 11.

The crankshaft 50 is connected to the motor m and rotates if the motor m is activated.

Figure 3A:
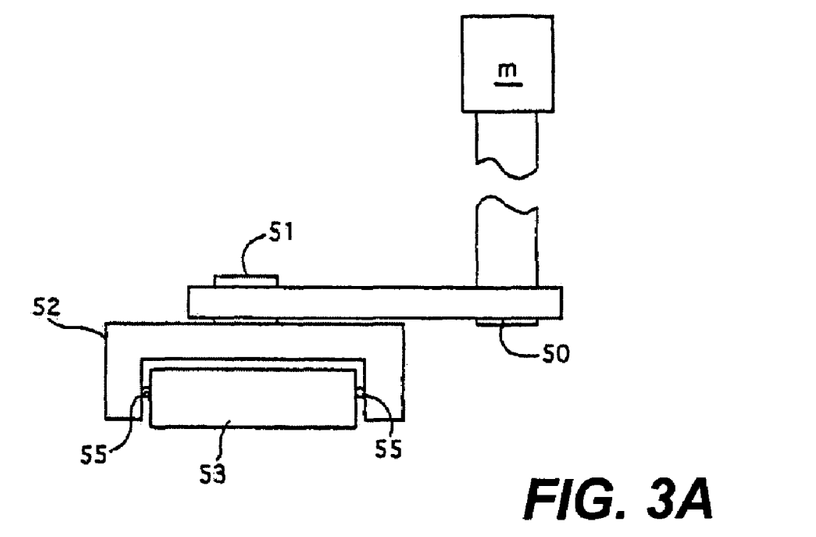
FIGS. 3A, 3B and 3C are sectional views taken respectively along lines 3A-3A, 3B-3B and 3C-3C of FIG. 2.
Figure 3B:
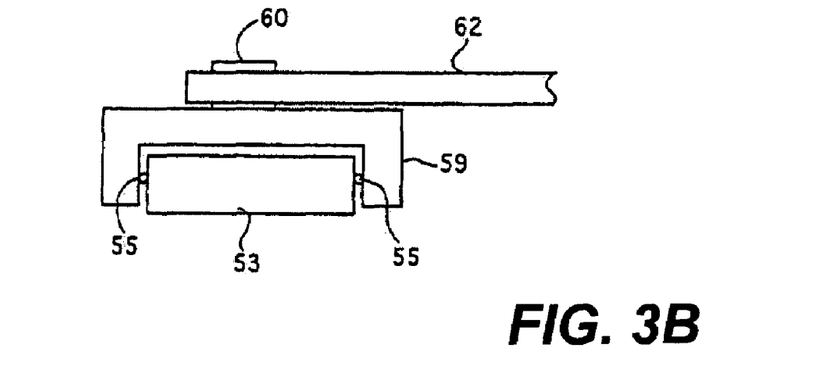

As shown in FIG. 3A, the sliding plate 52 is rotatably attached to a position eccentric from this crankshaft 50 by a specified distance and the slidable shaft 53 is slidably attached to this sliding plate 52 through balls 55.

Figure 3C:
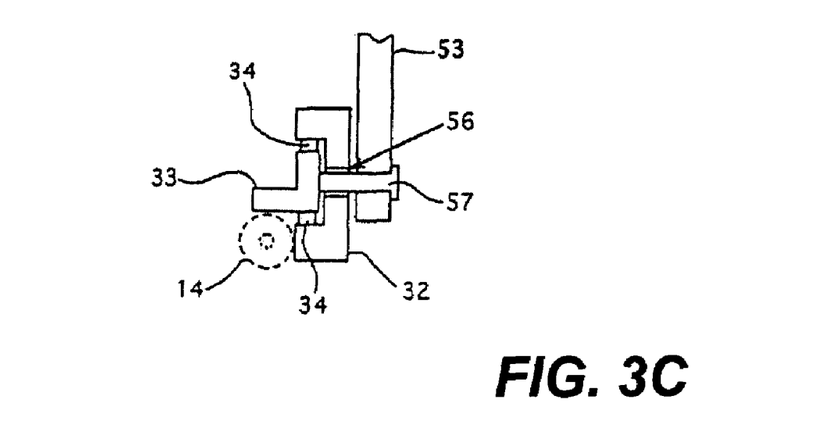

The end of the slidable shaft 53 towards the sliding plate 52 is an free end. The other end is attached rotatably to the slider 33, as shown in FIG. 3C, through an axial shaft 57 passing through a hole 56 in the frame 33. This hole 56 may be elongated in the direction of arrow T1.

The crankshaft mechanism 35 further includes an amplitude varying means 58 for determining the position of the fulcrum part 54. The amplitude varying means 58 comprises a second sliding plate 59, a fulcrum member 60 attached rotatably to this second sliding plate 59 as the fulcrum part 54 and being at a position above the slidable shaft 53, and a fulcrum moving means 61 for moving the second sliding plate 59 having this fulcrum member 60 attached to it to move along the slidable shaft 53.

This fulcrum moving means 61 comprises an arm 62 having the fulcrum member 60 rotatably attached thereto, a ball screw b for moving the arm 60 reciprocatingly in the direction of arrows T7 and T8, and a motor m.

As the fulcrum part 54 is moved to and positioned on the side of one of the end parts of the slidable shaft 53 (on the side of the sliding plate 52 at the eccentric position from the crankshaft 50), the distance of reciprocating motion (or the amplitude of oscillation) of the contact roller 14 in the radial direction of the disk 11 becomes large. If the fulcrum part 54 is moved to and positioned on the side of the other end part of the shaft 53 (on the side of the slider 33), on the other hand, the distance of reciprocating motion (or the amplitude of oscillation) of the contact roller 14 in the radial direction of the disk 11 becomes smaller. In other words, the distance of reciprocating motion (or the amplitude of oscillation) of the contact roller 14 in the radial direction of the disk 11 can be determined by selectively positioning the fulcrum part 54 on the slidable shaft 53.

A rack 63 is affixed to the arm 62 which moves reciprocatingly in the directions of arrows T7 and T8 together with the arm 62 as the ball screw b and the motor 8 are operated. This causes the gear wheel 64 engaging with the rack 63 to rotate. The rotation of this gear wheel 64 is detected by a sensor s such that the position of the fulcrum part 54 on the slidable shaft 53 is detected.

The means for rotating the crankshaft 50 includes a motor m (shown in FIG. 3A) and the frequency of the oscillation (shown by arrow T1) can be controlled by controlling the rotation of this motor. If the rotation of the motor is made faster, the frequency of the oscillation becomes higher. If the motor is rotated slower, the frequency of the oscillation becomes lower. Thus, the frequency of reciprocating motion of the contact roller 14 in the radial direction of the disk 11 (frequency of the oscillation) can be controlled by controlling the rotation of the motor. A high-speed motor (with rotational speed of 3000 rpm) may be included as an example of this motor. The frequency of the oscillation is within the range of 5 Hz or more and 50 Hz or less, or preferably within the range of 20 Hz or more and 50 Hz or less.

An example of the conditions of processing embodying this invention is summarized in Table 1 below.

TABLE 1

| | |
|---|---|
| Rotational speed of disk | 5 rpm or more and 3000 rpm or less |
| Amplitude of oscillation | 1 mm or less |
| Frequency of oscillation | 2 Hz or more and 50 Hz or less |
| Compressive pressure of contact roller | 300gf or more and 1000gf or less |
| Hardness of contact roller | 40 duro or more and 90 duro or less |
| Feeding speed of processing tape | 5 mm/minute or more and |

TABLE 1-continued

| Tension in processing tape | 100 mm/minute or less 200gf or more and 1000gf or less |
| --- | --- |

The disk processing device 10 of this invention described above is used to process the disk 11. The disk 11 is held by the spindle 12 and is rotated. Both surfaces of the disk 11 are sandwiched and pressed by the processing tapes 13 through the contact rollers 14 by means of the tape pressing means 19. The processing tapes 13, being pressed on the surfaces of the disk 11, are advanced and wound up by the tape reel unit 18 through each of the contact rollers 14. The crankshaft 50 is rotated such that the sliding plate 52 is rotated around the crankshaft 50. The slidable shaft 53 is rotated around the fulcrum part 54 thereon while sliding along the sliding plate 52 such that the contact rollers 14 is moved reciprocatingly in the radial direction of the disk 11 (as shown by arrow T1) together with the slider 33 attached rotatably to the slidable shaft 53.

According to the processing method of this invention, the amplitude varying means 58 is used to select the position the fulcrum part 54 on the slidable shaft 53 for determining the distance of the reciprocating motion of the contact roller 14 (or the amplitude of the oscillation) in the radial direction of the disk 11.

The crankshaft 50 is rotated by means of the motor m shown in FIG. 3A. The frequency of the reciprocating motion of the contact roller 14 in the radial direction of the disk 11 is controlled by controlling the rotation of this motor.

What is claimed is:

1. A disk processing device for processing both surfaces of a disk, said disk processing device comprising:
    a spindle for holding and rotating said disk; and
    a processing head with a pair of contact rollers for pressing processing tapes to said both surfaces of said disk;
    wherein said processing head includes:
    a first contact roller unit and a second contact roller unit each with oscillating means for causing corresponding one of said contact rollers to move reciprocatingly in a radial direction of said disk held by said spindle;
    a tape reel unit for supplying and winding up said processing tapes pressed to said both surfaces of said disk through said contact rollers; and
    tape pressing means for causing said first and second contact roller units to slide, sandwiching said both surfaces of said disk with said contact rollers and pressing said processing tapes onto said both surfaces of said disk;
    wherein said oscillating means comprises:
    a slider which is reciprocatingly movable in a radial direction of said disk and to which corresponding one of said contract rollers is attached; and
    a crankshaft mechanism for reciprocatingly moving said slider in said radial direction of said disk; and
    wherein said crankshaft mechanism comprises:
    a crankshaft;
    crankshaft rotating means for rotating said crankshaft;
    a sliding plate which is rotatably attached eccentrically to said crankshaft and has a rotary shaft that rotates around said crankshaft if said crankshaft rotates;
    a slidable shaft which is slidably attached to said sliding plate and has one end that is on the side of said sliding plate and is a free end and the other end that is rotatably attached to said slider; and
    a fulcrum part provided on said slidable shaft.

2. The disk processing device of claim 1 wherein said crankshaft mechanism further comprises amplitude varying means for positioning said fulcrum part.

3. The disk processing device of claim 2 wherein said amplitude varying means includes:
    a second sliding plate slidably attached to said slidable shaft;
    a fulcrum member above said slidable shaft and attached rotatably to said second sliding plate as said fulcrum part; and
    a fulcrum moving means for moving said second sliding plate having said fulcrum member attached thereto along said slidable shaft.

4. The disk processing device of claim 1 wherein said crankshaft rotating means includes a motor.

5. A method of processing a disk by using a disk processing device, said disk processing device comprising:
    a spindle for holding and rotating said disk; and
    a processing head with a pair of contact rollers for pressing processing tapes to said both surfaces of said disk;
    wherein said processing head includes:
    a first contact roller unit and a second contact roller unit each with oscillating means for causing corresponding one of said contact rollers to move reciprocatingly in a radial direction of said disk held by said spindle;
    a tape reel unit for supplying and winding up said processing tapes pressed to said both surfaces of said disk through said contact rollers; and
    tape pressing means for causing said first and second contact roller units to slide, sandwiching said both surfaces of said disk with said contact rollers and pressing said processing tapes onto said both surfaces of said disk;
    wherein said oscillating means comprises:
    a slider which is reciprocatingly movable in a radial direction of said disk and to which corresponding one of said contract rollers is attached; and
    a crankshaft mechanism for reciprocatingly moving said slider in said radial direction of said disk; and
    wherein said crankshaft mechanism comprises:
    a crankshaft;
    crankshaft rotating means for rotating said crankshaft;
    a sliding plate which is rotatably attached eccentrically to said crankshaft and has a rotary shaft that rotates around said crankshaft if said crankshaft rotates;
    a slidable shaft which is slidably attached to said sliding plate and has one end that is on the side of said sliding plate and is a free end and the other end that is rotatably attached to said slider; and
    a fulcrum part provided on said slidable shaft;
    said method comprising the steps of;
    causing said disk to be held and rotated by said spindle;
    using said tape pressing means to sandwich said both surfaces of said disk with said processing tapes through said contact rollers and pressing said processing tapes on said both surfaces of said disk;
    supplying and winding up said processing tapes pressed to said both surfaces of said disk through said contact rollers by means of said tape reel unit; and
    rotating said crankshaft, thereby rotating said sliding plate around said crankshaft, rotating said slidable shaft around said fulcrum part provided to said slidable shaft while causing said slidable shaft to slide along said sliding plate, and causing said contact roller to move reciprocatingly in a radial direction of said disk together with said slider rotatably attached to said slidable shaft.

6. The method of claim 5 wherein said crankshaft mechanism further comprises amplitude varying means for positioning said fulcrum part.

7. The method of claim 6 wherein said amplitude varying means includes:
- a second sliding plate slidably attached to said slidable shaft;
- a fulcrum member above said slidable shaft and attached rotatably to said second sliding plate as said fulcrum part; and
- a fulcrum moving means for moving said second sliding plate having said fulcrum member attached thereto along said slidable shaft.

8. The method of claim 5 wherein said crankshaft rotating means includes a motor.

9. The method of claim 5 further comprising the steps of positioning said fulcrum part on said slidable shaft and thereby determining a distance of reciprocating motion of said contact roller in the radial direction of said disk.

10. The method of claim 9 wherein said crankshaft mechanism further comprises amplitude varying means for positioning said fulcrum part.

11. The method of claim 10 wherein said amplitude varying means includes:
- a second sliding plate slidably attached to said slidable shaft;
- a fulcrum member above said slidable shaft and attached rotatably to said second sliding plate as said fulcrum part; and
- a fulcrum moving means for moving said second sliding plate having said fulcrum member attached thereto along said slidable shaft.

12. The method of claim 9 wherein said crankshaft rotating means includes a motor.

13. The method of claim 5 wherein said step of rotating said crankshaft comprises the step of rotating a motor, said step of rotating the motor further comprising the step of controlling the rotation of said motor and thereby controlling the frequency of the reciprocating motion of said contact roller in the radial direction of said disk.

14. The method of claim 13 wherein said crankshaft mechanism further comprises amplitude varying means for positioning said fulcrum part.

15. The method of claim 14 wherein said amplitude varying means includes:
- a second sliding plate slidably attached to said slidable shaft;
- a fulcrum member above said slidable shaft and attached rotatably to said second sliding plate as said fulcrum part; and
- a fulcrum moving means for moving said second sliding plate having said fulcrum member attached thereto along said slidable shaft.

16. The method of claim 13 wherein said crankshaft rotating means includes a motor.

* * * * *